(12) United States Patent
Lu

(10) Patent No.: US 7,686,519 B2
(45) Date of Patent: Mar. 30, 2010

(54) HARDENED FIBER OPTIC HOUSING AND CABLE ASSEMBLY

(75) Inventor: Yu Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/764,490

(22) Filed: Jun. 18, 2007

(65) Prior Publication Data

US 2008/0310796 A1 Dec. 18, 2008

(51) Int. Cl.
G02B 6/38 (2006.01)

(52) U.S. Cl. .............................. 385/69; 385/56; 385/60; 385/72

(58) Field of Classification Search .................... 385/56, 385/60, 69, 72

See application file for complete search history.

(56) References Cited

U.S. PATENT DOCUMENTS

| | | | |
|---|---|---|---|
| 4,140,366 A | 2/1979 | Makuch et al. |
| 4,140,367 A | 2/1979 | Makuch et al. |
| 4,142,776 A | 3/1979 | Cherin et al. |
| 4,174,882 A | 11/1979 | McCartney |
| 4,225,214 A | 9/1980 | Hodge et al. |
| 4,279,467 A | 7/1981 | Borsuk et al. |
| 4,354,731 A | 10/1982 | Mouissie |
| 4,684,205 A | 8/1987 | Margolin et al. |
| 4,705,352 A | 11/1987 | Margolin et al. |
| 4,715,675 A | 12/1987 | Kevern et al. |
| 4,725,120 A | 2/1988 | Parzygnat |
| 4,793,683 A | 12/1988 | Cannon, Jr. et al. |
| 4,820,185 A | 4/1989 | Moulin |
| 4,902,238 A | 2/1990 | Iacobucci |
| 4,961,623 A | 10/1990 | Midkiff et al. |

(Continued)

FOREIGN PATENT DOCUMENTS

CA  2 531 264 A1  6/2006

(Continued)

OTHER PUBLICATIONS

U.S. Appl. No. 11/607,676, filed Dec. 1, 2006 entitled "Network Interface Device".

(Continued)

Primary Examiner—Hemang Sanghavi
Assistant Examiner—John M Bedtelyon
(74) Attorney, Agent, or Firm—Merchant & Gould P.C.

(57) ABSTRACT

A female fiber optic connector includes an outer housing, a single internal male fiber optic connector, and a fiber optic adapter. The outer housing has a first end, which receives a fiber optic cable, positioned opposite from a second end, which defines a connector port for receiving an external male connector. The single internal male fiber optic connector is positioned within the outer housing and includes a ferrule in which a fiber is terminated. The fiber optic adapter is positioned within the outer housing and includes an alignment sleeve, a first end, which receives the single internal male fiber optic connector with the ferrule of the single internal male fiber optic connector positioned within the alignment sleeve, and an opposite second end facing toward the connector port and being configured so that a ferrule of the external male connector fits within the alignment sleeve when inserted in the connector port.

13 Claims, 3 Drawing Sheets

U.S. PATENT DOCUMENTS

| | | | |
|---|---|---|---|
| 5,042,901 A | 8/1991 | Merriken et al. |
| 5,048,915 A | 9/1991 | Coutts et al. |
| 5,104,242 A | 4/1992 | Ishikawa |
| 5,212,752 A | 5/1993 | Stephenson et al. |
| 5,214,830 A | 6/1993 | Rozycki |
| 5,267,342 A | 11/1993 | Takahashi et al. |
| 5,276,750 A | 1/1994 | Manning |
| 5,283,848 A | 2/1994 | Abendschein et al. |
| 5,317,663 A | 5/1994 | Beard et al. |
| 5,390,270 A | 2/1995 | Hanzawa et al. |
| 5,465,313 A | 11/1995 | Belenkiy et al. |
| 5,590,229 A | 12/1996 | Goldman et al. |
| 5,633,970 A | 5/1997 | Olson et al. |
| 5,715,342 A | 2/1998 | Nodfelt et al. |
| 5,751,874 A | 5/1998 | Chudoba |
| 5,778,122 A | 7/1998 | Giebel et al. |
| 5,887,095 A | 3/1999 | Nagase |
| 5,892,870 A | 4/1999 | Fingler et al. |
| 5,892,871 A | 4/1999 | Dahan et al. |
| 5,920,669 A | 7/1999 | Knecht et al. |
| 5,923,804 A | 7/1999 | Rosson |
| 5,940,559 A | 8/1999 | Noll |
| 5,946,436 A | 8/1999 | Takashi |
| 5,971,625 A | 10/1999 | Lu |
| 5,993,071 A | 11/1999 | Hultermans |
| 6,079,881 A | 6/2000 | Roth |
| 6,149,313 A | 11/2000 | Giebel et al. |
| 6,151,432 A | 11/2000 | Nakajima et al. |
| RE37,028 E | 1/2001 | Cooke et al. |
| 6,179,475 B1 | 1/2001 | Takamatsu et al. |
| 6,186,670 B1 | 2/2001 | Austin et al. |
| 6,188,822 B1 | 2/2001 | McAlpine et al. |
| RE37,079 E | 3/2001 | Stephenson et al. |
| RE37,080 E | 3/2001 | Stephenson et al. |
| 6,206,579 B1 | 3/2001 | Selfridge et al. |
| 6,234,683 B1 | 5/2001 | Waldron et al. |
| 6,234,685 B1 | 5/2001 | Carlisle et al. |
| 6,254,278 B1 | 7/2001 | Andrews et al. |
| 6,264,374 B1 | 7/2001 | Selfridge et al. |
| 6,298,190 B2 | 10/2001 | Waldron et al. |
| 6,305,849 B1 | 10/2001 | Roehrs et al. |
| 6,357,929 B1 | 3/2002 | Roehrs et al. |
| 6,371,660 B1 | 4/2002 | Roehrs et al. |
| 6,419,402 B1 | 7/2002 | Zimmel |
| 6,427,035 B1 | 7/2002 | Mahony |
| 6,428,215 B1 | 8/2002 | Nault |
| 6,461,057 B2 | 10/2002 | Chen |
| 6,466,725 B2 | 10/2002 | Battey et al. |
| 6,496,641 B1 | 12/2002 | Mahony |
| 6,522,804 B1 | 2/2003 | Mahony |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,568,861 B2 | 5/2003 | Benner et al. |
| 6,579,014 B2 | 6/2003 | Melton et al. |
| 6,614,980 B1 | 9/2003 | Mahony et al. |
| 6,619,697 B2 | 9/2003 | Griffioen et al. |
| 6,625,375 B1 | 9/2003 | Mahony |
| 6,629,782 B2 | 10/2003 | McPhee et al. |
| 6,648,520 B2 | 11/2003 | McDonald et al. |
| 6,652,156 B2 | 11/2003 | Shinagawa et al. |
| 6,655,851 B1 | 12/2003 | Lee |
| 6,668,127 B1 | 12/2003 | Mahony |
| 6,678,448 B2 | 1/2004 | Moisel et al. |
| 6,685,361 B1 | 2/2004 | Rubino et al. |
| 6,695,489 B2 | 2/2004 | Nault |
| 6,702,478 B2 | 3/2004 | Inagaki et al. |
| 6,714,710 B2 | 3/2004 | Gimblet |
| 6,739,759 B1 | 5/2004 | Seeley |
| 6,783,281 B2 | 8/2004 | Cheng |
| 6,785,450 B2 | 8/2004 | Wagman et al. |
| 6,789,950 B1 | 9/2004 | Loder et al. |
| 6,848,836 B2 | 2/2005 | Ueda et al. |
| 6,899,467 B2 | 5/2005 | McDonald et al. |
| 6,916,120 B2 | 7/2005 | Zimmel et al. |
| 6,962,445 B2 | 11/2005 | Zimmel et al. |
| 7,044,650 B1 | 5/2006 | Tran et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,137,742 B2 | 11/2006 | Theuerkorn et al. |
| 7,146,090 B2 | 12/2006 | Vo et al. |
| 7,201,518 B2 | 4/2007 | Holmquist |
| 7,204,644 B2 | 4/2007 | Barnes et al. |
| 7,207,727 B2 * | 4/2007 | Tran et al. ............ 385/76 |
| 7,244,066 B2 | 7/2007 | Theuerkorn |
| 7,264,402 B2 | 9/2007 | Theuerkorn et al. |
| 7,292,763 B2 | 11/2007 | Smith et al. |
| 7,317,863 B2 | 1/2008 | Lu et al. |
| 7,329,049 B2 * | 2/2008 | Meek et al. ............ 385/55 |
| 7,331,719 B2 | 2/2008 | Manning et al. |
| 7,572,065 B2 * | 8/2009 | Lu et al. ............ 385/78 |
| 2001/0036345 A1 | 11/2001 | Gimblet et al. |
| 2002/0022392 A1 | 2/2002 | Below et al. |
| 2002/0062978 A1 | 5/2002 | Sakabe et al. |
| 2002/0081077 A1 | 6/2002 | Nault |
| 2002/0150350 A1 | 10/2002 | Zimmel |
| 2003/0063866 A1 | 4/2003 | Melton et al. |
| 2003/0063867 A1 | 4/2003 | McDonald et al. |
| 2003/0094298 A1 | 5/2003 | Morrow et al. |
| 2003/0095754 A1 | 5/2003 | Matsumoto et al. |
| 2004/0017983 A1 | 1/2004 | Chen et al. |
| 2004/0047566 A1 | 3/2004 | McDonald et al. |
| 2004/0120663 A1 | 6/2004 | Lail et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0041928 A1 | 2/2005 | Zimmel et al. |
| 2005/0064752 A1 | 3/2005 | Serino |
| 2005/0117850 A1 | 6/2005 | Milette |
| 2005/0232553 A1 | 10/2005 | Holmquist |
| 2006/0088247 A1 | 4/2006 | Tran et al. |
| 2006/0088248 A1 | 4/2006 | Tran et al. |
| 2006/0115219 A1 | 6/2006 | Mudd et al. |
| 2007/0025665 A1 | 2/2007 | Dean, Jr. et al. |
| 2007/0077010 A1 | 4/2007 | Melton et al. |
| 2008/0175541 A1 | 7/2008 | Lu et al. |

FOREIGN PATENT DOCUMENTS

| | | |
|---|---|---|
| DE | 35 37 684 A1 | 4/1987 |
| EP | 0 156 075 A2 | 10/1985 |
| EP | 0 547 778 A1 | 6/1993 |
| EP | 0 581 527 A1 | 2/1994 |
| EP | 0 689 069 A1 | 12/1995 |
| EP | 0 762 171 A1 | 3/1997 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 258 758 A2 | 11/2002 |
| EP | 1 333 537 A1 | 8/2003 |
| EP | 1 457 793 A2 | 9/2004 |
| GB | 2 154 333 A | 9/1985 |
| JP | 62-54204 | 3/1987 |
| JP | 5-106765 | 4/1993 |
| JP | 2001-116968 | 4/2001 |

| | | |
|---|---|---|
| WO | WO 94/15232 | 7/1994 |

OTHER PUBLICATIONS

U.S. Appl. No. 11/657,403, filed Jan. 24, 2007 entitled "Fiber Optic Connector Mechanical Interface Converter".

U.S. Appl. No. 11/657,404, filed Jan. 24, 2007 entitled "Hardened Fiber Optic Connector".

Delphi Connection Systems, "Harsh Environment Hermaphroditic Fiber Optic Connectors," 16 pages (© 2002).

Office Action mailed Jan. 17, 2008 in U.S. Appl. No. 11/657,403.

Opti Tap™ Connector. An Evolant Solutions Product, 2 pages (Sep. 2005).

Stratos Lightwave™ Brochure, "HDLC Hermaphroditic Butt Joint Connector," 2 pages (known as prior art at least as early as Sep. 8, 2003).

Stratos Lightwave™ Brochure, "HQLC Hermaphroditic Butt Joint Connector," 2 pages (known as prior art at least as early as Sep. 8, 2003).

International Search Report and Written Opinion mailed Sep. 22, 2008.

* cited by examiner

HARDENED FIBER OPTIC HOUSING AND CABLE ASSEMBLY

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

SUMMARY

One aspect of the present disclosure relates to a ruggedized female fiber optic connector adapted to be mounted at the end of a fiber optic cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
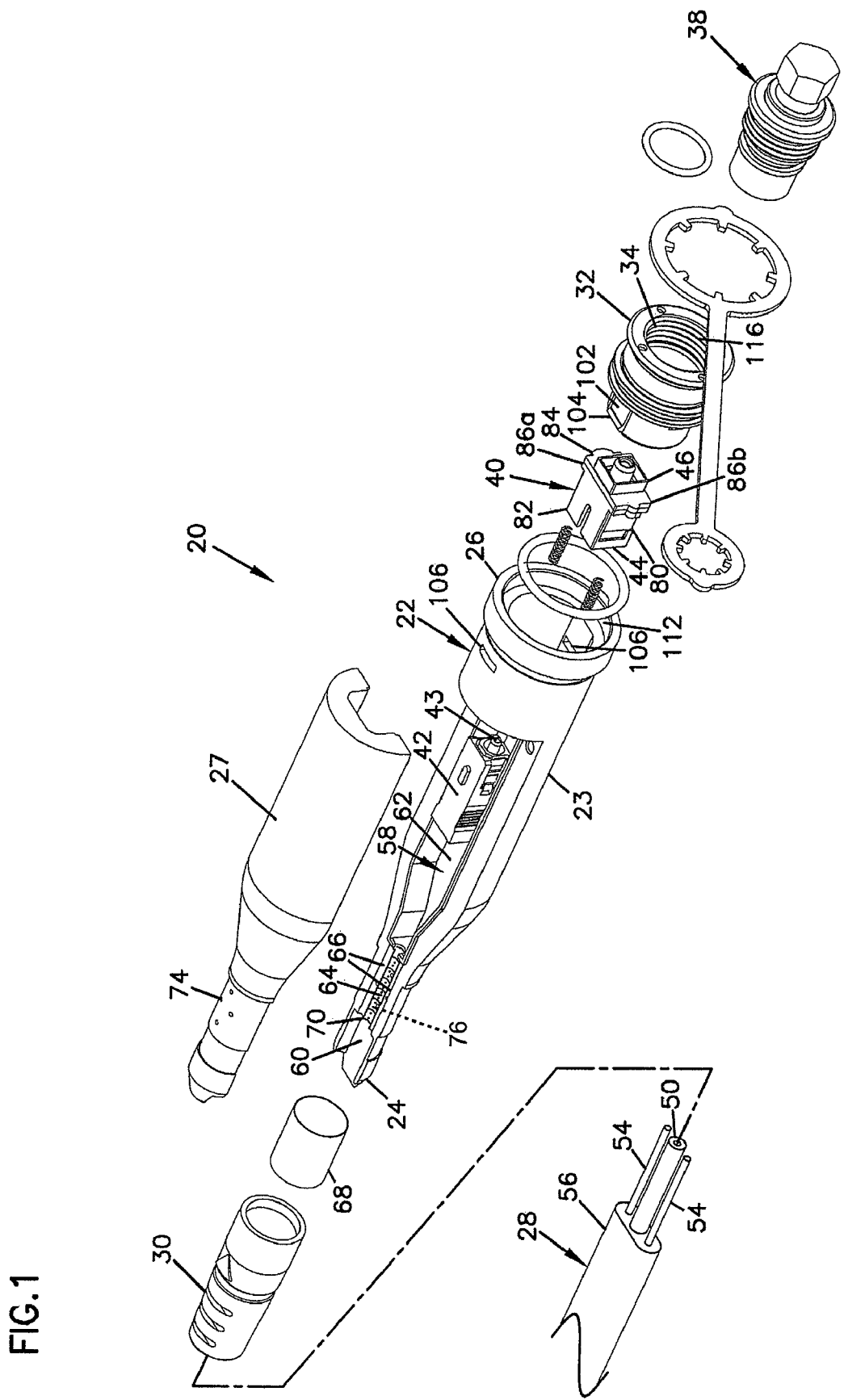
FIG. 1 is a perspective view of an example female fiber optic connector having features that are examples of inventive aspects in accordance with the principles of the present disclosure.
Figure 3:
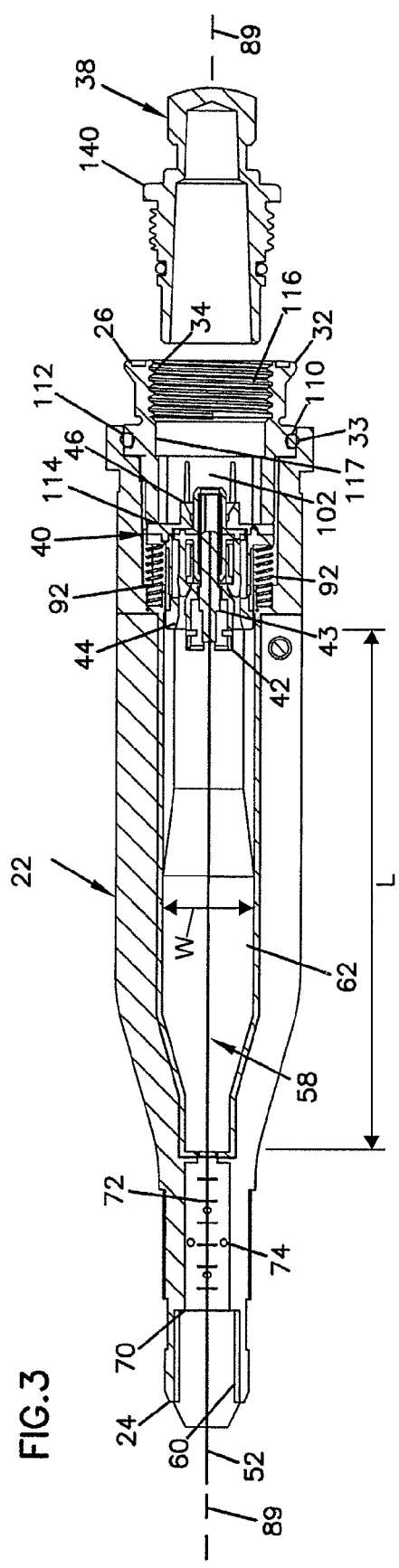
FIG. 3 is a cross-sectional view taken along section line 3-3 of FIG. 2.

FIG. 1 shows a female fiber optic connector 20 having features that are examples of inventive aspects in accordance with the principles of the present disclosure. The female fiber optic connector 20 includes an outer housing 22 having a first end 24 positioned opposite from a second end 26. The outer housing 22 includes a main body 23, an end piece 32 that mounts to the main body 23 at the second end 26 of the outer housing 22, and a side cover 27. The side cover 27 mounts laterally to the main body 23 and forms a majority of one side of the outer housing 22. The first end 24 of the outer housing 22 is adapted to receive a fiber optic cable 28. A flexible boot 30 can be mounted over the interface between the fiber optic cable 28 and the first end 24 of the outer housing 22. The second end 26 of the outer housing 22 is adapted to receive an external male fiber optic connector. For example, the end piece 32 at the second end 26 of the outer housing 22 defines a port 34 sized to receive an external male fiber optic connector 36 (see FIG. 5). When the female fiber optic connector 20 is in transit or not in use, the port 34 can receive a plug 38 that prevents dust, water or other contaminants from entering the interior the outer housing 22. The female fiber optic connector 20 also includes a fiber optic adapter 40 retained within the outer housing 22 by the end piece 32. The female fiber optic connector 20 further includes a single internal male fiber optic connector 42 positioned within the outer housing 22. As shown at FIG. 3, the internal male fiber optic connector 42 includes a ferrule 43 positioned within a first end 44 of the fiber optic adapter 40. When the external male fiber optic connector 36 is inserted into the port 34, a ferrule 48 of the external male fiber optic connector 36 is received within a second end 46 of the fiber optic adapter 40 such that an optical connection is provided between the external male fiber optic connector 36 and the internal male fiber optic connector 42.

In the depicted embodiment, the female fiber optic connector 20 and the external male fiber optic connector 36 are hardened or ruggedized. By hardened or ruggedized, it is meant that the female fiber optic connector 20 and the external male fiber optic connector 36 are adapted for outside environmental use. For example, the female fiber optic connector 20 and the external male fiber optic connector 36 can include environmental seals for preventing moisture/water intrusion. Also, it is preferred for the external male fiber optic connector 36 to be able to withstand a 100 pound axial pull-out force when coupled to the female fiber optic connector 20. The internal male fiber optic connector 42 is preferably non-ruggedized. In one embodiment, the internal male fiber optic connector 42 can be a conventional fiber optic connector such as a capitalized subscription channel ("SC") connector. One example of an SC connector is illustrated and described in U.S. Pat. No. 5,317,663, that is hereby incorporated by reference in its entirety.

The fiber optic cable 28 can include at least one optical fiber capable of carrying optical signals. The optical fiber includes a core surrounded by cladding. The core is the light-conducting central portion of the optical fiber. The cladding surrounds the core and is composed of a material having a lower index of refraction than the material of the core. Light is internally reflected within the core to transmit the optical signal along the core. The optical fiber can be protected within a buffer tube. The fiber optic cable can also include strength members within the fiber optic cable to increase the tensile strength of the fiber optic cable. Example strength members include aramid yarn, metal such as steel and epoxy reinforced glass roving. The optical fiber, strength members, buffer tube and other cable components can be surrounded by an outer jacket or sheath that provides a protective covering for the cable components. As shown at FIG. 1, the fiber optic cable 28 includes a central buffer tube 50 containing an optical fiber 52. Strength members 54 are positioned on opposite sides of the central buffer tube 50. The strength members 54 and the central buffer tube 50 are positioned within an outer jacket 56 of the fiber optic cable 28.

Referring to FIG. 3, the outer housing 22 of the female fiber optic connector 20 defines ports 60, 34 at its first and second ends 24, 26, respectively. A through-passage 58 extends through the outer housing 22 from the port 60 to the port 34. As previously described, the port 34 is adapted to receive the external male fiber optic connector 36. The port 60 is adapted for allowing the fiber optic cable 28 to be inserted into the through-passage 58. The through-passage 58 includes an enlarged interior compartment 62 in which the internal male fiber optic connector 42 is located. The through-passage 58 also includes a cylindrical central passage portion 64 that extends from the port 60 to the interior compartment 62. The through-passage 58 further includes cylindrical lateral passage portions 66 positioned on opposite sides of the central passage portion 64. The central passage portion 64 is sized to receive the central buffer tube 50 of the fiber optic cable 28. The lateral passage portions 66 are positioned and sized to receive the strength members 54 of the fiber optic cable 28. The port 60 is sized to receive the outer jacket 56 of the fiber optic cable 28.

To secure the fiber optic cable 28 to the female fiber optic connector 20, an end portion of the outer jacket 56 is first stripped from the fiber optic cable 28 as shown at FIG. 1. The fiber optic cable 28 is then passed through the boot 30 and a crimp sleeve 68. The end of the optical fiber 52 is then terminated in the ferrule 43 of the internal male fiber optic connector 42. The fiber optic cable 28 is then positioned with the end of the jacket 56 located within the port 60, the central buffer tube 50 located within the central passage portion 64, and the strength members 54 located within the lateral passage portions 66. As so positioned, the end of the outer jacket 56 preferably abuts against a shoulder 70 of the outer housing 22. A securing substance/material 76 (e.g., an adhesive such as epoxy or other adhering material) can be applied within the central passage portion 64 and the lateral passage portions 66 to secure the central buffer tube 50 and the strength members 54 within their respective passage portions 64, 66. Slots 72, knurling or other structures can be provided along the central passage portion 64 to enhance an adhesion within the outer housing 22.

After the securing material 76 has been applied and the end of the fiber optic cable 28 has been positioned within the outer housing 22, the side cover 27 of the outer housing 22 can be mounted to the main body 23 and affixed in place with a securing material such as adhesive. Bleed holes 74 can be provided though the outer housing 22 to allow excess adhesive to exit the interior of the outer housing 22 when the side cover 27 is pressed in place. After the side cover 27 has been mounted on the main body 23 of the outer housing 22, the crimp sleeve 68 can be positioned over a rear region of the outer housing 22 and radially compressed into place to provide for the mechanical retention of the side cover 27 to the main body 23. Finally, the boot 30 can be mounted over the first end 24 of the outer housing 22. In certain embodiments, a shrink tube or shrink wrap tape can be placed around the outer jacket 56 of the fiber optic cable 28 and around the exterior of the outer housing 22 adjacent the first end 24 prior to positioning the boot 30 over the first end 24 of the main outer housing 22. Shrink wrap sleeves or tapes of this type can provide an improved moisture barrier for preventing moisture from entering the interior of the outer housing 22.

After the securing material has been applied and the end of the fiber optic cable 28 has been positioned within the outer housing 22, the side cover 27 of the outer housing 22 can be mounted to the main body 23 and affixed in place with a securing material such as adhesive. Bleed holes 74 can be provided through the outer housing 22 to allow excess adhesive to exit the interior of the outer housing 22 when the side cover 27 is pressed in place. After the side cover 27 has been mounted on the main body 23 of the outer housing 22, the crimp sleeve 68 can be positioned over a rear region of the outer housing 22 and radially compressed into place to provide for the mechanical retention of the side cover 27 to the main body 23. Finally, the boot 30 can be mounted over the first end 24 of the outer housing 22. In certain embodiments, a shrink tube or shrink wrap tape can be placed around the outer jacket 56 of the fiber optic cable 28 and around the exterior of the outer housing 22 adjacent the first end 24 prior to positioning the boot 30 over the first end 24 of the main outer housing 22. Shrink wrap sleeves or tapes of this type can provide an improved moisture barrier for preventing moisture from entering the interior of the outer housing 22.

Figure 4:
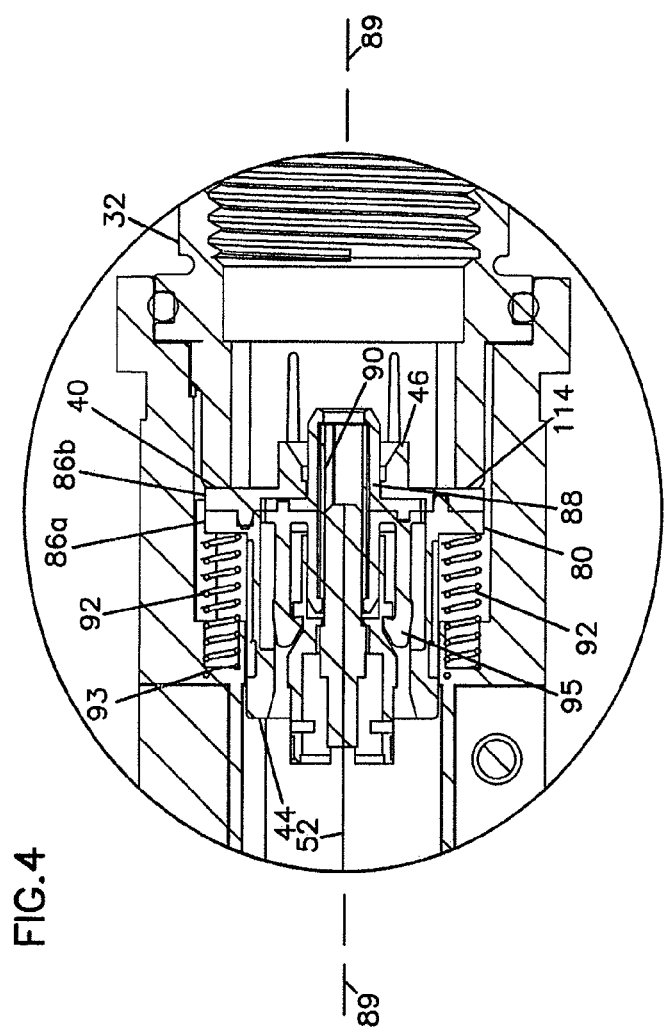
FIG. 4 is an enlarged, detailed view of a portion of FIG. 3.

Referring to FIGS. 1, 3 and 4, the fiber optic adapter 40 of the female fiber optic connector 20 includes an adapter housing 80 having a first piece 82 that defines the first end 44 of the fiber optic adapter 40, and a second piece 84 that defines the second end 46 of the fiber optic adapter 40. The first and second pieces 82, 84 include flanges 86a, 86b that are interconnected together to join the first piece 82 to the second piece 84. The first and second pieces 82, 84 cooperate to define a cylindrical barrel portion 88 having a central axis that aligns with a central axis 89 of the outer housing 22. A conventional ferrule alignment sleeve 90 is mounted within the barrel portion 88. As is known in the art, the ferrule alignment sleeve 90 is free to float slightly within the barrel portion 88.

Referring to FIGS. 3 and 4, the fiber optic adapter 40 is mounted within the outer housing 22 with the first end 44 facing toward the interior compartment 62 and the second end 46 facing toward the port 34 of the end piece 32. The fiber optic adapter 40 is configured to float within the outer housing 22. For example, springs 92 are configured to bias the fiber optic adapter 40 toward the port 34 but allow the fiber optic adapter 40 to move axially along the central axis 89 during insertion of the external male fiber optic connector 36 into the port 34. As shown in FIG. 3, the springs 92 are captured between an inner shoulder 93 of the main body 23 and the flange 86a of the first piece 82 of the adapter housing 80.

Prior to mounting the side cover 27 on the main body 23 of the outer housing 22, the internal male fiber optic connector 42 is inserted into the first end 44 of the fiber optic adapter 40. The first piece 82 of the adapter housing 80 includes resilient latching fingers 95 adapted for retaining the internal male fiber optic connector 42 within the first end 44 of the fiber optic adapter 40. With the internal male fiber optic connector 42 inserted within the first end 44, the ferrule 43 of the internal male fiber optic connector 42 is inserted within one end of the ferrule alignment sleeve 90. When the external male fiber optic connector 36 is inserted into the port 34, the ferrule 48 of the external male fiber optic connector 36 fits within the other end of the ferrule alignment sleeve 90. In this manner, the ferrule alignment sleeve 90 aligns the ferrules 43, 48 such that corresponding fibers within the ferrules 43, 48 are coaxially aligned along the central axis 89. In this manner, fiber optic signals can effectively be conveyed from one fiber optic connector to the other.

The end piece 32 of the outer housing 22 fits within an end portion of the main body 23 and forms the second end 26 of the outer housing 22. In the depicted embodiment, the end piece 32 includes resilient latches 102 having tabs 104 that snap-fit within corresponding openings 106 defined by the main body 23. In this manner, when the end piece 32 is inserted into the end portion of the main body 23, the flexible latches flex inwardly until the tabs 104 reach the openings 106 defined by the main body 23. When the tabs 104 reach the openings 106, the latches 102 flex outwardly causing the tabs 104 to snap within the corresponding openings 106 thereby securing the end piece 32 within the main body 23.

Referring to FIG. 3, the end piece 32 of the outer housing 22 includes a circumferential groove 110 in which a sealing member 33 (e.g., an elastomeric O-ring or other sealing member) is mounted. When the end piece 32 is inserted within the main body 23, the sealing member 33 engages a corresponding annular sealing surface 112 defined within the main body 23 to provide an environmental seal located circumferentially between the end piece 32 and the inside of the main body 23. The end piece 32 also includes an end surface 114 that engages the flange 86b of the second piece 84 of the adapter housing 80 to retain the adapter housing 80 within the outer housing 22. The end piece 32 further includes internal threads 116 positioned within the port 34. The internal threads 116 are adapted to mate with corresponding external threads 121 provided on a retention nut 118 of the external male fiber optic connector 36.

Figure 5:
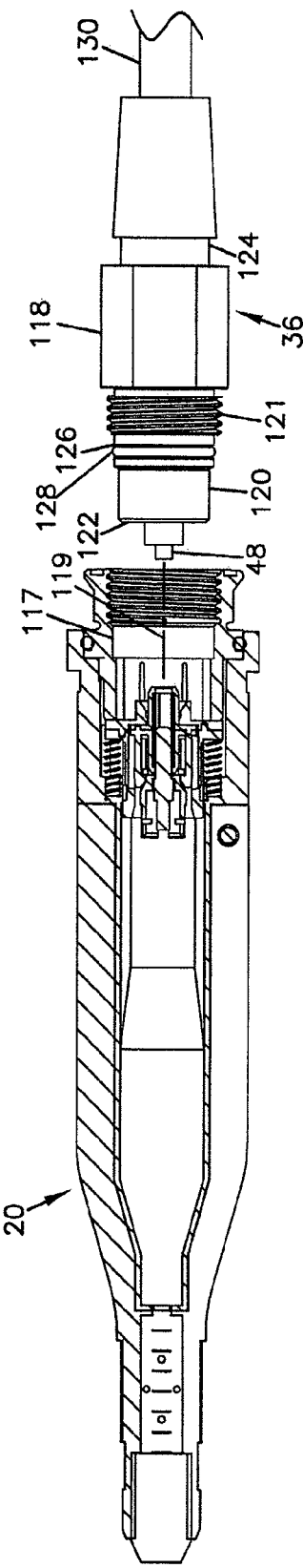
FIG. 5 shows the female fiber optic connector of FIG. 1 aligned with a corresponding male fiber optic connector.

Referring to FIG. 5, the external male fiber optic connector 36 includes a main body 120 having a first end 122 positioned opposite from a second end 124. A circumferential groove 126 is defined around the main body 120. A sealing member 128 (e.g., a resilient O-ring) is mounted within the circumferential groove 126. The retention nut 118 is rotatably mounted on the main body 120 of the external male fiber optic connector 36 at a location between the sealing member 128 and the second end 124. The retention nut 118 can be manually turned relative to the main body 120 about a central longitudinal axis 119 of the main body 120. The second end 124 of the main body 120 is adapted to receive and secure a fiber optic cable 130. The ferrule 48 of the external male fiber optic connector 36 is mounted at the first end 122 of the main body 120.

Figure 2:
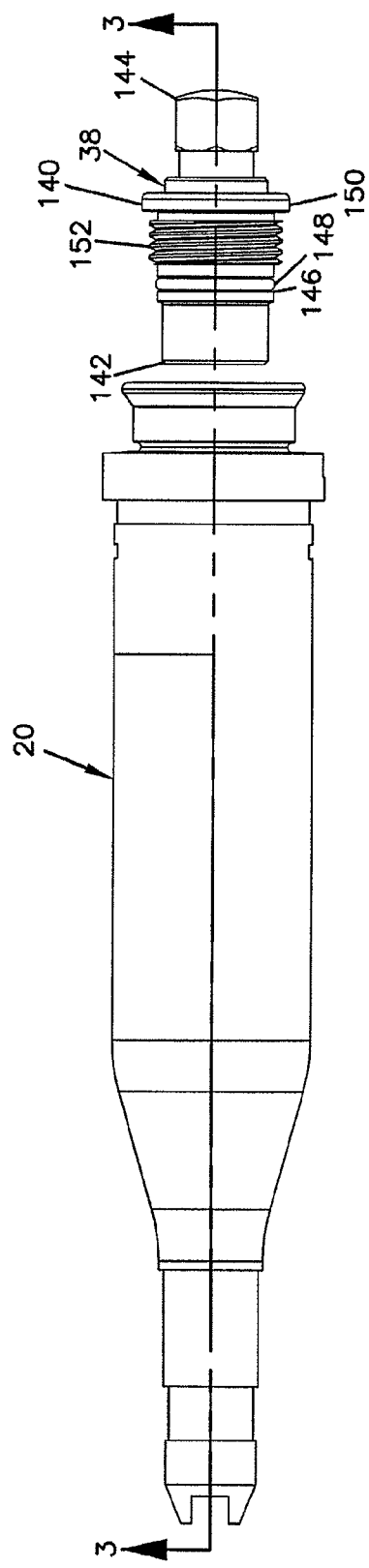
FIG. 2 is a side view of the female fiber optic connector of FIG. 1.

Referring to FIGS. 2 and 3, the plug 38 includes a plug body 140 having a first end 142 positioned opposite from a second end 144. The first end 142 is adapted for insertion into the port 34 of the female fiber optic connector 20. The second end 144 is adapted to be manually grasped. A circumferential groove 146 is defined around the exterior of the plug body 140. A sealing member 148 (e.g., a resilient O-ring) is mounted within the circumferential groove 146. The plug body 140 also includes an annular flange 150 that is spaced from the circumferential groove 146. External threads 152 are defined about the exterior of the plug body 140 between the circumferential groove 146 and the annular flange 150. In use, the first end 142 of the plug body 140 is inserted into the port 34 until the external threads 152 of the plug engage the internal threads 116 of the port 34. The plug 38 is then manually turned to thread the external threads 152 of the plug 38 into the internal threads 116 of the port 34. When the plug 38 is fully threaded into the port 34, the sealing member 148 of the plug 38 engages an annular sealing surface 117 of the end piece 32.

To make a fiber optic connection between the external male fiber optic connector 36 and the female fiber optic connector 20, the plug 38 is removed from the port 34 by unthreading the plug and axially pulling the plug 38 from the port 34. Thereafter, the first end 122 of the external male fiber optic connector 36 is inserted into the port 34 until the ferrule 48 is inserted into the ferrule alignment sleeve 90. The retaining nut 118 of the external male fiber optic connector 36 is then threaded into the internal threads 116 of the port 34 to provide secure retention of the external male fiber optic connector 36 within the port 34. With the ferrule 48 of the external male fiber optic connector 36 inserted within the ferrule alignment sleeve 90, a fiber retained within the ferrule 48 is placed in coaxial alignment with the optical fiber 52 secured within the ferrule 43 of the internal male fiber optic connector 42. This alignment between the optical fibers allows an optical transmission to pass from fiber to fiber within the fiber optic adapter 40. Additionally, the sealing member 128 forms a circumferential environmental seal through engagement with the annular sealing surface 117 of the end piece 32.

Referring to FIG. 3, the springs 92 can compress to allow the adapter 40 to move rearwardly in an axial direction within the outer housing 22 (e.g., during insertion of the connector 36 into the port 34 of the connector 20). To accommodate the range of axial movement provided to the adapter 40 by the spring arrangement, the bare fiber 52 housed within the compartment 62 bends generally in a sinusoidal pattern as the adapter 40 is forced rearwardly. The interior compartment 62 preferably has a length L and a cross-dimension W that are sufficiently large to allow the fiber 52 to bend without violating standard minimum bend radius requirements associated with optical fibers.

From the forgoing detailed description, it will be evident that modifications and variations can be made in the devices of the disclosure without departing from the spirit or scope of the invention.

What is claimed is:

1. A fiber optic connector housing and cable assembly comprising:
   a fiber optic cable;
   an outer housing defining a first central axis and including a first end positioned opposite from a second end, the first end of the outer housing defining a cable port for receiving the fiber optic cable and the second end of the outer housing defining a ruggedized connector port including a sealing surface and internal threads, the outer housing further including a through-passage extending from the cable port to the ruggedized connector port, the through-passage including an enlarged interior compartment;

a single internal fiber optic connector positioned entirely within the enlarged interior compartment of the through-passage of the outer housing, the single internal fiber optic connector including a first ferrule in which a fiber of the fiber optic cable is terminated;

a fiber optic adapter positioned within the outer housing, the fiber optic adapter defining a second central axis aligned with the first central axis of the outer housing, the fiber optic adapter including an alignment sleeve, a first end and an opposite second end, the first end of the fiber optic adapter receiving the single internal fiber optic connector with the first ferrule of the single internal fiber optic connector positioned within the alignment sleeve, the second end of the fiber optic adapter facing toward the ruggedized connector port; and a ruggedized external fiber optic connector including a main body having a first end positioned opposite from a second end, a second ferrule mounted at the first end of the main body, an O-ring mounted within a circumferential groove defined around the main body, and a retention nut rotatably mounted on the main body between the O-ring and the second end of the main body;

wherein external threads of the retention nut mate with the internal threads of the ruggedized connector port; and wherein the O-ring of the ruggedized external fiber optic connector engages the sealing surface of the ruggedized connector port and the second ferrule of the ruggedized external fiber optic connector aligns with the first ferrule of the single internal fiber optic connector within the alignment sleeve of the fiber optic adapter when the ruggedized external fiber optic connector is fully threaded into the internal threads of the ruggedized connector port;

wherein the fiber optic cable includes at least one strength member and the through-passage of the outer housing includes at least one lateral passage portion sized to receive the at least one strength member, and wherein the at least one strength member is received by and adhesively secured to the at least one lateral passage portion of the through-passage of the outer housing.

2. The fiber optic connector housing and cable assembly of claim 1, wherein the outer housing includes an elongate main body, an end piece inserted into an end portion of the elongate main body to form the second end of the outer housing, and a side cover that mounts laterally to the elongate main body.

3. The fiber optic connector housing and cable assembly of claim 2, wherein the end piece defines the ruggedized connector port, and wherein the end piece defines internal threads within the ruggedized connector port.

4. The fiber optic connector housing and cable assembly of claim 3, wherein the end piece is retained within the elongate main body by a snap-fit connection.

5. The fiber optic connector housing and cable assembly of claim 2, wherein the fiber optic adapter includes a flange and the end piece of the outer housing includes an end surface that engages the flange thereby retaining the fiber optic adapter within the elongate main body.

6. The fiber optic connector housing and cable assembly of claim 5, further comprising springs captured between the fiber optic adapter and a shoulder within the elongate main body.

7. The fiber optic connector housing and cable assembly of claim 2, wherein the single internal fiber optic connector is positioned entirely within the enlarged interior compartment of the through-passage of the outer housing by inserting the single internal fiber optic connector into the first end of the fiber optic adapter prior to adhesively affixing the side cover to the main body of the outer housing.

8. The fiber optic connector housing and cable assembly of claim 2, wherein the single internal fiber optic connector is positioned entirely within the enlarged interior compartment of the through-passage of the outer housing by inserting the single internal fiber optic connector into the first end of the fiber optic adapter prior to mechanically retaining the side cover to the main body of the outer housing with a crimp sleeve.

9. The fiber optic connector housing and cable assembly of claim 1, further comprising springs that bias the fiber optic adapter toward the ruggedized connector port.

10. The fiber optic connector housing and cable assembly of claim 9, wherein the enlarged interior compartment of the through-passage of the outer housing is sufficiently large to allow the fiber of the fiber optic cable to bend within the enlarged interior compartment without violating minimum bend radius requirements when the springs that bias the fiber optic adapter toward the ruggedized connector port are compressed as the fiber optic adapter is forced away from the ruggedized connector port.

11. The fiber optic connector housing and cable assembly of claim 1, further comprising a flexible boot positioned around the fiber optic cable and the first end of the outer housing.

12. The fiber optic connector housing and cable assembly of claim 1, wherein the single internal fiber optic connector is an SC connector.

13. The fiber optic connector housing and cable assembly of claim 1, wherein the fiber of the fiber optic cable terminated at the first ferrule of the single internal fiber optic connector is coaxially aligned with the first central axis of the outer housing, and wherein another fiber within the second ferrule of the ruggedized external fiber optic connector is also coaxially aligned with the first central axis of the outer housing when the ruggedized external fiber optic connector is inserted into the ruggedized connector port.

* * * * *